Sept. 27, 1960 W. L. JACKMAN 2,954,528
MONOSTABLE MULTIVIBRATOR
Filed Dec. 10, 1954
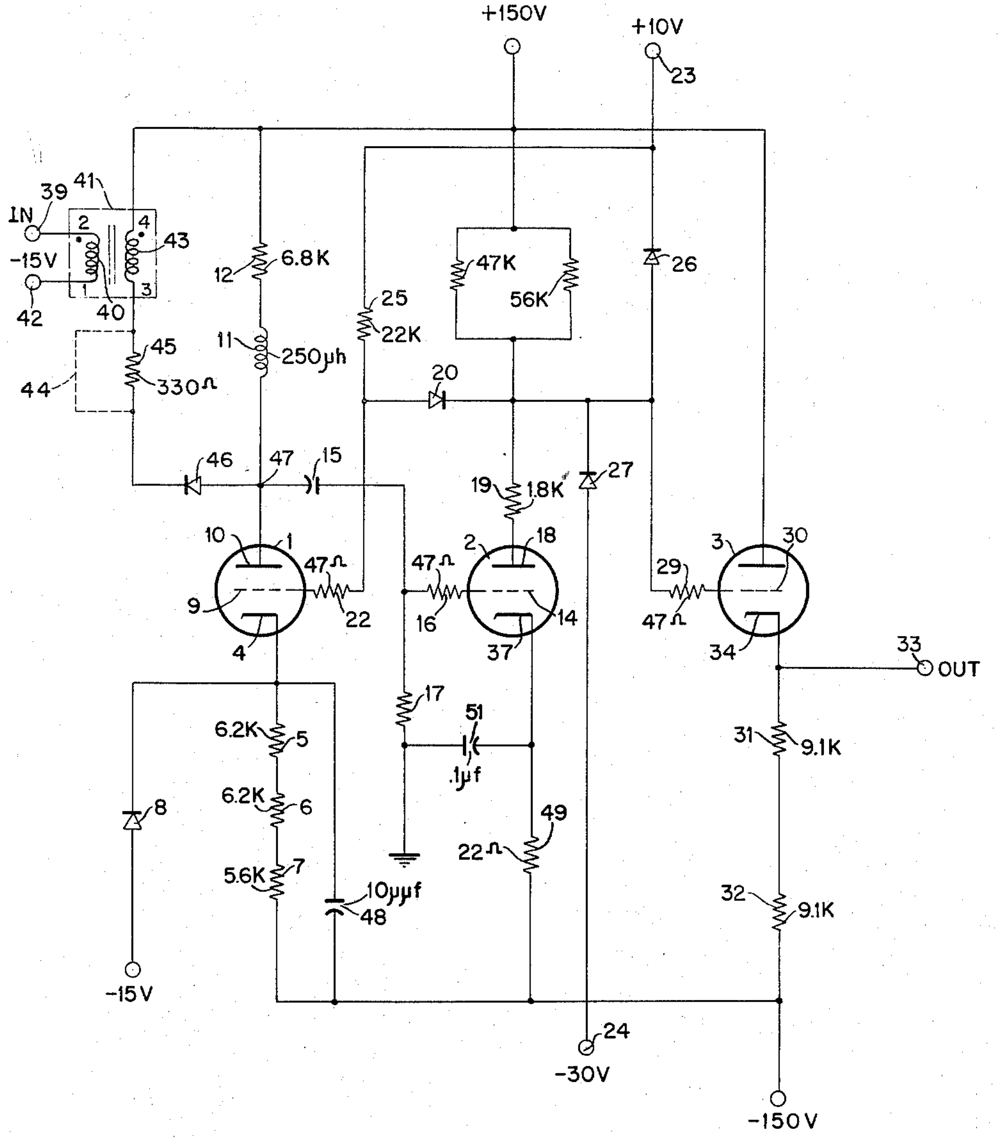
*INVENTOR.*
WILLIAM L. JACKMAN
*BY* Ralph C. Dustin
ATTORNEY United States Patent Office 2,954,528

Patented Sept. 27, 1960

2,954,528

MONOSTABLE MULTIVIBRATOR

William L. Jackman, Wappingers Falls, N.Y., assignor to International Business Machines Corporation, New York, N.Y., a corporation of New York Filed Dec. 10, 1954, Ser. No. 474,346

7 Claims. (Cl. 328—197)

The present invention relates to impulse generators of the multivibrator type, and more particularly to a multivibrator of the monostable or "single shot" type which operates to produce a gate pulse from each input driving pulse.

The conventional multivibrator circuit, frequently referred to as an electronic switch, is well known in the electrical art, and consists essentially of a pair of vacuum tubes, the output circuit of one being coupled to the input circuit of the other in such a manner that the initiation of plate current conduction in one tube operates to terminate the conduction of plate current in the other. The multivibrator is utilized as a switch because the rectangular waveform developed by such circuit is particularly adapted to function as a gate voltage. Multivibrators may be considered as comprising two general classes, the free-running multivibrator and the monostable or "single shot" multivibrator. The monostable or "single shot" multivibrator circuit has a stable or quiescent state during which the component vacuum tubes are in the conducting and non-conducting states respectively. Application of a driving pulse to this circuit reverses the conduction state of these tubes, thereby changing the normally stable state to a quasi-stable state for a predetermined time interval. The duration of this quasi-stable state is determined by the time necessary for the grid of the normally conducting tube to recover exponentially to the voltage level at which it again conducts. The pulse which functions to transfer current from one device to the other is usually designated as the trigger or driving pulse. The present invention is directed toward an improved multivibrator of the monostable or "single shot" type.

The conventional multivibrator circuit is generally unstable and capable of producing an output pulse of consistently uniform width for only a relatively brief period of time. This inherent lack of stability results from the fact that the pulse width or time duration of the output waveform is dependent not only on the time constant of the coupling network, but also on the stability of circuit parameters such as tube characteristics, supply voltage regulation, deterioration of tubes or other circuit components, etc. Thus a variation of any circuit parameter, such as those noted above, will result in a variation of the output pulse width.

Another important limitation generally associated with the conventional "single shot" type of multivibrator is the free-running tendency of such circuits, a further result of the inherent instability of the circuit. Under free-running conditions, plate current flow continually switches from one tube to another without the application of an external driving pulse, the frequency of this oscillation being determined in general by the value of circuit components, particularly the time constant in the coupling circuit. Thus, in the conventional single-shot circuit, deterioration of one of the tubes or circuit components will change a normally stable single-shot into a free-running multivibrator. Such operation is undesirable, particularly in circuit applications requiring only a single gate pulse be produced and maintained for a predetermined time interval in repsonse to a driving pulse.

In accordance with the general principles of the present invention, there is provided an improved "single shot" multivibrator capable of producing an output pulse of substantially uniform duration over a wide frequency range in response to a driving pulse. This circuit attains increased stability as contrasted with the conventional single shot multivibrator by means of cathode degeneration in one of the multivibrator tubes, and by plate clamping in the anode circuit of the other multivibrator tube. The cathode degeneration causes the associated multivibrator tube to become a constant current source relatively independent of the deterioration of tubes or other circuit components, while the plate clamping of the other multivibrator tube ensures a constant swing of the feedback potential of such circuit regardless of the tube condition. By limiting the effect of variation of circuit parameters in the manner set forth above, the tendency toward free-running associated with the conventional multivibrator circuit is substantially eliminated and an output pulse of substantially uniform time duration is thereby generated.

Accordingly, one of the objects of the present invention is to provide an improved impulse generator adapted to generate impulses having a relatively constant width or time duration despite variation of the circuit parameters.

Another object of the present invention is to provide an improved multivibrator circuit of the "single shot" type wherein the increased stability of the circuit substantially eliminates the tendency toward free-running.

Still another object of the present invention is to provide an improved "single shot" multivibrator circuit adapted to generate impulses of substantially invariable time duration wherein the timing circuit is maintained within close tolerances, despite relatively large variation in the characteristics of the component tubes or other circuit components.

A further object of the present invention is to provide an improved impulse generator having stabilizing facilities whereby it is enabled to generate impulses of relatively constant time duration.

A still further object of the present invention is to provide an improved multivibrator circuit wherein the cathode degeneration of one of the component vacuum tubes results in a relatively constant current source and furnishes a stabilizing facility to said circuit.

Another and still further object of the present circuit is to provide an improved multivibrator circuit of the "single shot" type wherein the plate clamping of one of the component vacuum tubes in ensuring a constant swing of feedback potential in the multivibrator coupling circuit provides another facility to stabilize the time duration of the output pulse.

Other objects of the present invention will be pointed out in the following description and claims and illustrated in the accompanying drawing which discloses, by way of example, the principle of the invention and the best mode, which has been contemplated, of applying that principle.

In the drawing, the single figure illustrates in schematic form an impulse generator of the multivibrator type, the circuit including a "single shot" multivibrator having a cathode follower output stage.

Referring now to the drawing, there is illustrated in schematic form a preferred embodiment of the present invention. Vacuum tubes 1 and 2 for purposes of clarity in the ensuing description will be referred to as multivibrator tubes, each of these tubes including a cathode, a control grid and an anode. Tube 3 constitutes part of a cathode follower stage, which is herein employed as a buffer stage for impedance matching between the multivibrator output and the load. A cathode follower output stage is utilized when driving a capacitive load to prevent variation of output pulse width resulting from loading effects on the circuit. Cathode 4 of tube 1 is connected through an impedance network including resistors 5, 6 and 7 to a −150 volt source of negative supply potential. A diode 8, interconnected between cathode 4 and a source of 15 volts negative potential, restricts the lower potential level of the cathode of tube 1 to a value sufficient to maintain tube 1 in a cut-off condition when the multivibrator circuit is in its quiescent state. Anode 10 of tube 1, in addition to being connected to the anode supply potential of +150 volts through inductance 11 and resistor 12, is coupled to control grid 14 of tube 2 through the RC network of capacitor 15, resistor 17 and parasitic suppressor resistor 16. This RC network comprising resistor 17 and capacitor 15 is the principal factor in determining the width of the output pulse. The feedback loop from anode 18 of tube 2 to control grid 9 of tube 1 consists of anode resistor 19, diode 20 and parasitic suppressor 22. A source of 10 volts positive potential is connected from terminal 23 through resistor 25 to the anode of diode 20. In the normal or quiescent state, i.e., tubes 1 and 2 are in the non-conducting and conducting states respectively, the anode of diode 20 is at a potential of −30 volts due to the plate current flow of multivibrator tube 2 therethrough. This potential of −30 volts, when applied to control grid 9 of tube 1, provides −15 volts net bias to maintain tube 1 in its cut-off condition. When the conduction states of tubes 1 and 2 are reversed by application of a driving pulse, the cathode of diode 20 rises rapidly to +10 volts as plate current flow in tube 2 is terminated. Control grid 9 of tube 1, connected to the anode of diode 20, rises to the same level, but at a slower rate determined by its own time constant due to the isolating effect of diode 20. Terminals 23 and 24 supply the upper and lower clipping potentials which are applied through associated diodes 26 and 27 to clip the output of tube 2 at levels of +10 and −30 volts respectively. Since the output potential of tube 2 is coupled to the input of tube 1, the grid swing applied to tube 1 is restricted to well defined levels, thus ensuring that the output potential from tube 1 applied to the RC network of resistor 17 and capacitor 15 will be closely defined during transition.

The multivibrator output from the anode of tube 2 is also connected through parasitic suppressor 29 to control grid 30 of cathode follower tube 3. The cathode follower stage, including cathode resistors 31 and 32, functions in a conventional manner as an impedance matching device to provide a low output impedance to the load circuit, not shown herein, and to permit stabilized operation with a capacitive load.

The operation of the subject circuit will now be described in detail, this description including the permissible deviation of circuit parameters whch will still provide stabilized output pulses of substantially invariable time duration.

To initiate operation, a positive driving pulse is applied through terminal 39 to primary winding 40 of input transformer 41, one end of whch is connected to a source of 15 volts negative potential at terminal 42. The inverted negative pulse is induced on secondary winding 43 and applied through resistor 45 and diode 46 to terminal 47. Terminal 47, in turn, is connected to anode 10 of tube 1 and to control grid 14 of tube 2 through capacitor 15 and resistor 16. Resistor 45 is employed to limit the sensitivity of the circuit in a manner to be described hereinafter.

The driving pulse herein employed has a base width between 0.08 and 0.12 microseconds and its amplitude may be any value between 20 and 40 volts. The wave shape may be a half sine wave, while the frequency at which these pulses are applied to the present circuit may vary between zero and 2 megacycles per second. The frequency is dependent upon the repetition rate of the circuit, which in turn is a function of the output pulse which PRF ½T, where T represents the output pulse width.

The above defined driving pulse, when applied to control grid 14, causes tube 2 to cut off, resulting in a rising potential at anode 18 of tube 2. This positive transition at anode 18 is coupled back to control grid 9 of tube 1 through a feedback loop comprising resistor 19, diode 20 and parasitic suppressor 22. Diode 20 is employed to isolate the Miller effect produced by tube 1 from the remainder of the circuit, i.e., to prevent the anode of tube 2 from driving the input capacity of tube 1 during positive transitions. As well known in the electrical art, the Miller effect is the apparent increase in the input capacity of a tube caused by the amplification of the circuit increasing the effective grid-plate capacity. Such effect is most prevalent in triode tubes, such as tube 1, since the grid to plate capacity is about 100 times greater than the corresponding capacity of a pentode. Therefore, control grid 9 of tube 1 rises to the upper level of 10 volts positive at its own time constant rather than under the control of feedback potential from tube 2, and the output rise time is considerably improved. The effect of the negative input on anode 10 of tube 1 is negligible, since it is considerably less than the decrease of potential produced at anode 10 by the reversal of conduction state of tube 1 and is present for only .1 microsecond. The plate clipping of tube 2 together with cathode degeneration introduced into tube 1 and described hereinafter are the two principal factors responsible for the high degree of precision of the present circuit.

Cathode resistors 5, 6 and 7 having values of 6.2K, 6.2K and 5.6K ohms respectively, provide a substantial degree of cathode degeneration in tube 1. As well known in the electrical art, cathode degeneration is that phenomenon wherein the potential of the cathode changes in the same direction as the signal potential applied to the control grid, thus reducing the variation in the potential applied to the control grid with respect to the cathode. Cathode degeneration is disclosed, for example, in "Electronic Circuits and Tubes" by Cruft Electronics Staff, published by McGraw-Hill Book Co., Inc., 1947, pages 414–417. Cathode degeneration takes place in any circuit having a cathode impedance, the amount of such degeneration varying as the ratio of the cathode impedance to the load impedance. A sufficient amount of cathode degeneration tends to convert a circuit in which it is utilized into a constant current source. Since bias variations in tube 1 resulting from changes in tube characteristic and anode supply voltage are small as compared with the potential across the cathode degenerating resistors 5, 6 and 7, the anode current is relatively independent of such changes. Capacitor 48, connected across the total cathode impedance of tube 1, is a high-frequency by-pass capacitor which increases the circuit gain of the stage at higher frequencies, thereby improving the shape of the output pulse by increasing the rise time.

As noted above, the effect of the cathode degeneration is to make the first stage of the multivibrator, i.e., tube 1 and associated circuits, a constant current source. The plate clipping of tube 2, by restricting the grid swing applied to tube 1 to well defined levels, ensures that the voltage change at the anode of tube 1 will also be closely defined. Hence the RC timing circuit comprising resistor 17 and capacitor 15 in the anode circuit of tube 1 has an almost constant charging current applied thereto, regardless of tube conditions, resulting in a definite time interval being required to charge capacitor 15 to the conduction potential of tube 2, and ultimately resulting in an extremely stable pulse width output. The variation in pulse width which ordinarily results from variation of one of the multivibrator tube characteristics is thereby eliminated.

The multivibrator switching action reduces plate current of tube 2 to zero and increases plate current of tube 1 to a maximum value. One end of capacitor 15, connected to anode 10 of tube 1, has a positive potential of 150 volts applied thereto when the multivibrator is in its quiescent state, since tube 1 is non-conducting and its anode potential is at the supply potential of +150 volts. The other end of the capacitor has a potential of —150 volts applied thereto, this potential being produced by the flow of grid current in tube 2 through resistors 16 and 17 to ground. When the conduction states of tubes 1 and 2 are reversed, the IR drop in the anode circuit of tube 1 causes the potential at anode 10 to drop from +150 to +90 volts, pulling the corresponding end of capacitor 15 to the same level. This negative transition of 60 volts is coupled through capacitor 15, causing the potential on the other end of capacitor 15 to drop by a corresponding amount from —150 to —210 volts, assuming a negligible loss through capacitor 15. The cathode degeneration in tube 1 ensures that the potential at the anode of tube 1 falls from approximately +150 to +90 volts irrespective of variation of tube parameters by ensuring a constant current flow through the anode impedance. Plate current from tube 1 permits capacitor 15 to charge exponentially toward ground until, after a definite time interval, it crosses the grid base or the cut-off potential of tube 2, at which time tube 2 conducts and initiates a reverse switching action. Because of its fundamental role in establishing the duration of the quasi-stable state of the circuit, the exponential waveform is called the timing waveform, and the coupling resistor 17 and capacitor 15 which primarily determine its time constant are called the timing resistor and timing capacitor respectively. The time required for capacitor 15 to charge to the cut-off potential of tube 2 is primarily determined by the time constant of the RC network of resistor 17 and capacitor 15. When tube 2 again conducts, indicating completion of a switching cycle, the resulting decreased potential at anode 18 is applied through diode 20 and parasitic suppressor 22 to control grid 9 of tube 1 to thereby cut off tube 1 and maintain it in the cut-off condition. The circuit then remains in its quiescent or stable state until the next trigger pulse is applied, at which time the above described sequence is repeated.

As already noted, resistor 45 is employed to limit the sensitivity of the "single shot" circuit. Sensitivity of the circuit, which is a function of the magnitude of capacitor 15, must be such that the circuit will provide the desired output when driven by a pulse of 20 volts amplitude. For larger values of capacitor 15, more of the voltage swing in the anode of tube 1 is coupled to control grid 14 of tube 2, thereby increasing the sensitivity of the circuit. For output pulse widths from 4 to 10 microseconds, the value of capacitor 15 is relatively small and therefore resistor 45 is not used, resulting in a relatively large amount of the input trigger pulse being coupled to the grid of tube 2, this condition being illustrated by dotted line 44 across resistor 45. However, on output pulse widths longer than 10 microseconds, the value of capacitor 15 is relatively large and therefore resistor 45 is employed to reduce the level of the input trigger pulse which is coupled to the control grid of tube 2. Diode 46, in series with transformer secondary winding 43, provides isolation between the input circuit and the plate load of tube 1. Resistor 49 and capacitor 51, connected to the cathode of tube 2, comprise a decoupling network associated with the cathode.

A cathode follower circuit functions as a buffer stage between the multivibrator and load. As is well known in the electrical art, the fall time of the output signal of a cathode follower is a function of the value of the cathode impedance. Cathode resistors 31 and 32, each having 9.1K ohms, are selected to give the lowest output impedance compatible with a nominally small fall time. Since the cathode impedance is also a function of the load to be driven, a maximum load, values of which will be pointed out hereinafter, was assumed. In applications where fall time is not a major consideration, the values of resistors 31 and 32 may obviously be increased in accordance with load requirements.

The high stability of the subject circuit may be illustrated by describing the limited variation of the output pulse width resulting from a deviation of circuit component values from the rated values shown on the drawing. The range of such deviation is described below, while the output pulse is maintained within a maximum deviation of ±15%. As herein employed, the term "pulse width" is defiend as the time interval between the center of the driving pulse, defined heretofore, to the break in the upper level at the start of the negative transition of the output pulse. As is well known in the electrical art, the fall time or negative transition of the output waveform of a cathode follower circuit is a direct function of the capacitive load of the circuit. If the definition of pulse width included the negative transition resulting from the load, the pulse width would of necessity be defined as a function of the load. Since the present circuit utilizes a cathode follower output stage, by selecting the start of the negative transition of the output pulse as the terminating point in the above definition of pulse width, the timing of the circuit need not be given as a function of the load, and the definition will apply irrespective of the load. The above definition of pulse width is employed to isolate loading effects from timing. The present circuit may be utilized for any output pulse width between 4 microseconds and 0.1 second.

As already noted, the RC coupling network comprising resistor 17 and capacitor 15 generally determines the width of the output pulse. Since pulse width is not exactly linear with the RC time constant, specific values of these components for all required pulse widths cannot be given. However, an approximate value for these components may be determined by using the expression $$\frac{RC}{t}=3.2$$

where R is the resistance in ohms, C the capacity in farads and $t$ the time in seconds. Resistor 17 determines the grid current of tube 2 and also affects the sensitivity of the circuit on short pulses. These factors limit the upper and lower values of resistor 17 which can be employed. To obtain the desired sensitivity and limit the grid current of tube 2 to a nominal value, resistor 17 must be between 220K and 680K ohms, while the corresponding values for capacitor 15 may be determined as described above. From the above expression, knowing the limits of resistor 17, a nominal value for the RC network for the required pulse width may be computed, and the final values determined by experimentation.

With respect to the tubes employed in the apparatus described, each of tubes 1, 2 and 3 are halves of a twin triode, type 5965, though obviously individual triodes may be employed as an alternative arrangement. With a 4 microsecond output pulse, variations in tube conditions between +25% and —40% (end of life condition) result in an error of ±6%, with a + error for cold tubes. At pulse widths of 10 microseconds and above, this error is essentially constant at ±4%. The errors described herein refer to the percentage of deviation of the output pulse width from the norm.

The effect of variation of the back resistance of diodes in the present circuit on the output pulse width was determined experimentally by shunting the diodes with 100K resistors. Variation of diodes 20, 26 and 27 in the above manner produced no change in pulse width. Diodes employed in the present apparatus have a nominal back resistance of 400K ohms, and an end of life resistance of 100K ohms.

With respect to components in the input circuit, a change of 1% in the value of resistor 12 causes slightly less than 1% change in pulse width. A variation of the back resistance of diode 46 from 400K ohms to 100K ohms results in approximately a 5% change in pulse width. Since resistor 45 is in series with the back resistance of diode 46, and has a resistance of 330 ohms as compared to a nominal diode back resistance of 400K ohms, its variations have a negligible effect on pulse width.

A shortening of the output pulse width through a decrease of the positive transition time will result from increased driving pulse amplitude. This error is a fixed 0.05 microsecond, independent of output pulse width, for an input pulse level from +20 to +40 volts. For a pulse width of 10 microseconds, for example, this error would be 0.5%.

Variations in component values due to normal aging produce an error of ±10% independent of the pulse width employed. Component specifications for the subject apparatus include an "end of life" condition for certain components such as tubes, diodes, etc., the "end of life" conditions of which have already been specified. "End of life" condition specifies the maximum permissible deviation of a component from its rated value before it must be replaced, and varies according to the nature of the component.

With respect to the precision required by circuit components, resistors 5, 6, 7, 12 and 17 are the most critical circuit components and must be maintained within 1% of their rated value to obtain the results recited above. 1% circuit components, particularly resistors, are well known in the art and commercially available. Capacitor 15 may have a normal variation of 2.5% from its rated value, with an end of life tolerance of 7.5% deviation. None of the remaining components are critical, and, in general, a 5% deviation from their rated values is permissible.

To maintain the tolerances described previously, maximum limits had to be set on the assumed load which the single-shot will drive. If the cathode follower is heavily loaded, it will draw a considerable amount of grid current from tube 2. Since grid 14 of tube 2 is connected directly to the feedback path, both timing and sensitivity are affected by this grid current. To meet the specifications applied to the subject circuit involving input trigger amplitude, pulse width variation and rise and fall time of the output pulse above described, a limit of 70 micro-microfarads capacitance and/or 39K ohms resistance is the maximum impedance imposed by the load.

While there have been shown and described and pointed out the fundamental novel features of the invention as applied to a particular embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A monostable multivibrator adapted to generate pulses of substantially constant time duration in response to each driving pulse applied thereto comprising first and second vacuum tubes having normally stable states of conduction and non-conduction respectively, each of said vacuum tubes having at least a cathode, an anode and a control grid, means for applying a driving pulse to the control grid of said first vacuum tube of sufficient magnitude to initiate reversal of the normally stable state of said first vacuum tube, means responsive to the reversal of conduction state of said first vacuum tube for coupling a potential having predetermined upper and lower levels from the anode of said first tube to the control grid of said second tube to thereby initiate conduction in said second tube, means associated with the cathode of said second tube for ensuring a constant current flow therethrough, a coupling circuit including a resistor and capacitor interconnecting the anode of said second tube to the control grid of said first tube and responsive to said constant current flow for reversing the conduction state of said first tube after a predetermined interval and output means associated with the anode of said first tube for applying the generated pulse to a load.

2. A monostable multivibrator adapted to generate a pulse of predetermined width in response to a driving pulse applied thereto comprising first and second vacuum tubes having opposite stable and quasi-stable states of conduction, each of said vacuum tubes having at least a cathode, an anode and a control grid, a first coupling circuit for coupling the anode of said first vacuum tube to the control grid of said second vacuum tube and adapted to control the amplitude of the feedback signal applied to the control grid of said second vacuum tube to a relatively constant value, a second coupling circuit connecting the anode of said second vacuum tube to the control grid of said first tube, said first coupling circuit being adapted in response to said driving pulse to reverse the conduction state of said second vacuum tube from the stable to the quasi-stable state of conduction and said second coupling circuit being adapted to reverse said first vacuum tube from the quasi-stable to the stable state of conduction after a predetermined interval, said interval being determined principally by a resistor-capacitor circuit in said second coupling circuit, and means associated with the cathode of said second vacuum tube for ensuring a constant current flow therethrough during said quasi-stable state, said constant current flow into the resistor-capacitor circuit in said second coupling circuit serving to control the duration of said quasi-stable state and thereby control the width of said generated pulses.

3. A device of the character described in claim 2 wherein said first coupling circuit adapted to control the amplitude of the feedback signal includes a pair of clipping circuits adapted to control the upper and lower level of said feedback signal.

4. A device of the character described in claim 2 wherein said means associated with the cathode of said second vacuum tube for ensuring a constant current flow therethrough during said quasi-stable state comprises a cathode degeneration circuit.

5. An impulse generator adapted to generate signals of predetermined amplitude and duration in response to each signal applied thereto comprising first and second vacuum tubes having stable and quasi-stable states of conduction, means responsive to an input signal to alter the conduction state of said first vacuum tube from the stable to the quasi-stable state and thereby vary the potential at the anode of said first tube, means for directly coupling the anode of said first tube to the control grid of said second tube whereby the conduction state of said second tube is altered to the quasi-stable state, said coupling means functioning to control the variation of potential at the anode of said first tube within predetermined limits, a capacitive coupling circuit interconnected between the anode of said second tube and the control grid of said first tube, said circuit being responsive to the quasi-stable state of said second tube to discharge to a predetermined potential, and a constant current source associated with said second vacuum tube for varying the charge of the capacitor in said coupling circuit whereby said second and first tubes are returned to their stable state after a predetermined interval to thereby control the duration of said generated signal.

6. A multivibrator adapted to generate output pulses of substantially uniform duration despite any variation of circuit parameters comprising first and second vacuum tubes having opposite states of conduction, each of said vacuum tubes having at least a cathode, an anode and a control grid, first and second coupling means interconnecting the anodes of said first and second vacuum tubes to the control grids of said second and first vacuum tubes respectively, means for initiating generation of said output pulse by producing a potential variation at the anode of said first tube in response to a signal applied to the control grid of said first tube, voltage regulating means associated with said first coupling means for regulating said potential variation within predetermined upper and lower levels, means responsive to said potential variation for reversing the conduction state of said second tube from its stable to its quasi-stable state, means associated with said second tube for producing a constant current flow therethrough during said quasi-stable state despite any variation of said second tube parameters, said means comprising a cathode degeneration circuit wherein the ratio of the cathode impedance to the load impedance is sufficiently high to produce a constant current flow and a resistor capacitor timing network interconnected between the anode of said second tube and the control grid of said first vacuum tube, said capacitor being responsive to the constant current flow in said first tube to reverse said first tube to its stable conduction state after a predetermined interval.

7. An impulse generator comprising a first vacuum tube, a second vacuum tube, each of said vacuum tubes having at least a cathode, an anode and a control grid, a source of space current for said tubes, first and second means coupling the anodes of said first and second vacuum tubes to one terminal of said source, third and fourth means coupling the cathodes of said first and second vacuum tubes to the other terminal of said source, means responsive to a positive input signal for terminating conduction in said first vacuum tube whereby a positive potential is generated at the anode of said first tube, a direct current coupling circuit between the anode of said first vacuum tube and the control grid of said second vacuum tube adapted to initiate conduction in said second vacuum tube in response to said positive potential, voltage regulating means associated with said direct current coupling circuit for controlling the upper and lower levels of said positive potential from the anode of said first vacuum tube, a capacitor interconnected between the anode of said second vacuum tube and the control grid of said first vacuum tube, means associated with the cathode of said second vacuum tube for providing a constant current flow after initiation of conduction therein whereby the potential levels at the anode of said second vacuum tube remain constant during the stable and quasi-stable states of said second vacuum tube and determine the reference potential from which said capacitor recharges and means responsive to the recharge of said capacitor to return said vacuum tubes to their stable state after a predetermined interval whereby a pulse of predetermined duration is generated by said impulse generator.

References Cited in the file of this patent

UNITED STATES PATENTS

| | | |
|---|---|---|
| 2,356,071 | MacDonald et al. | Aug. 15, 1944 |
| 2,469,031 | Canfora | May 3, 1949 |
| 2,470,028 | Gordon | May 10, 1949 |
| 2,516,867 | Harris | Aug. 1, 1950 |
| 2,644,887 | Wolfe | July 7, 1953 |
| 2,750,502 | Gray | June 12, 1956 |
| 2,764,677 | Graham | Sept. 25, 1956 |
| 2,784,910 | Ghiorso et al. | Mar. 12, 1957 |
| 2,797,320 | Beaufoy | June 25, 1957 |